Jan. 24, 1961
L. E. HUGHES ET AL
2,968,919
VARIABLE AREA NOZZLE
Filed March 25, 1957
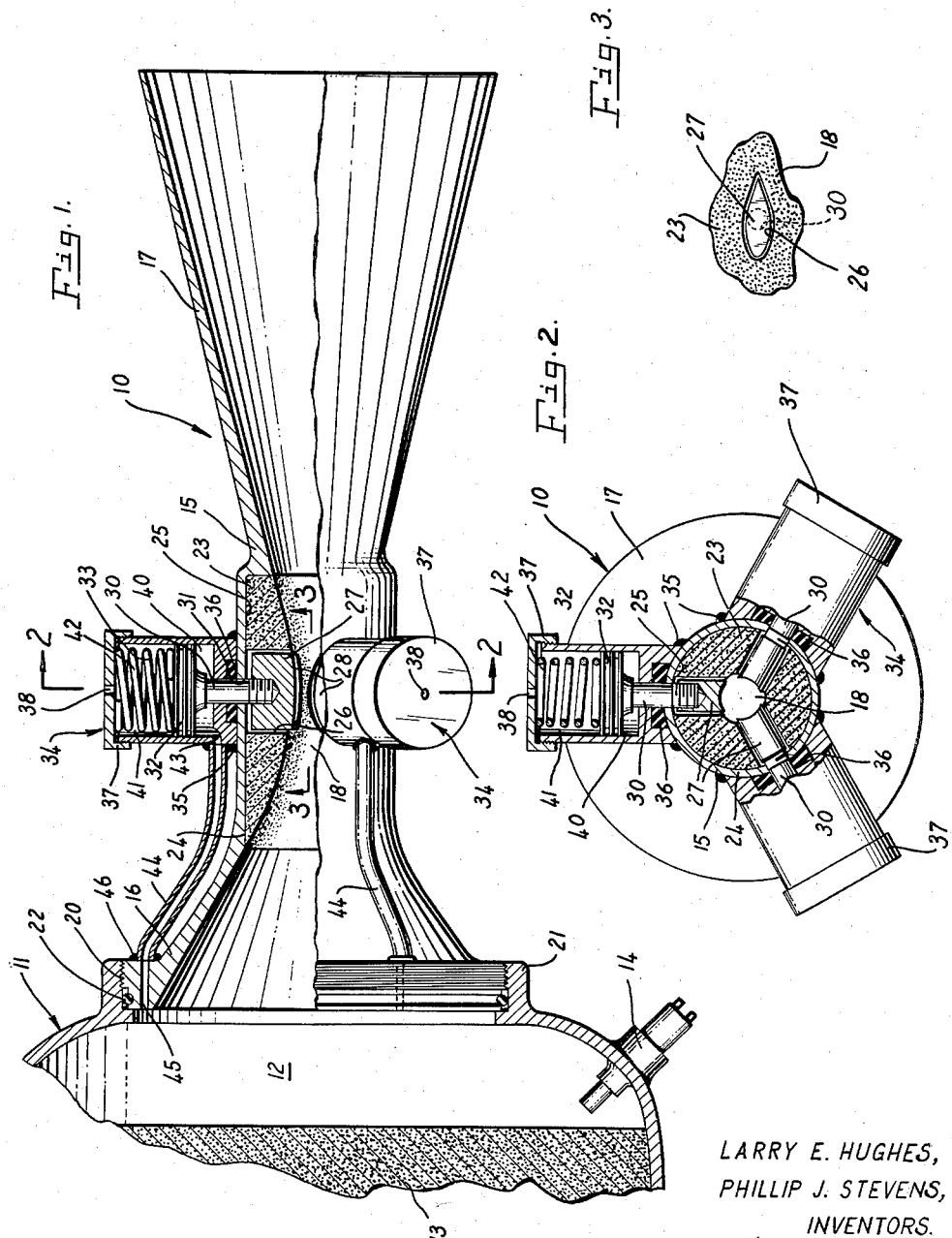
LARRY E. HUGHES,
PHILLIP J. STEVENS,
INVENTORS.
BY
AGENT United States Patent Office 2,968,919
Patented Jan. 24, 1961

2,968,919

VARIABLE AREA NOZZLE

Larry E. Hughes, Granada Hills, and Phillip J. Stevens, Los Angeles, Calif., assignors to Hughes Aircraft Company, Culver City, Calif., a corporation of Delaware Filed Mar. 25, 1957, Ser. No. 649,589

2 Claims. (Cl. 60—35.6)

This invention finds general utility in the field of nozzle structures and particular utility in the field of variable types of nozzles for use in fluid flow control as in delivery of propellants from rocket motors and like devices.

In such apparatus as rocket motors and associated structure, it is normal practice to employ a type of liquid or solid rocket propellant wherein the substances thereof are temperature sensitive. In other words, pressure within a rocket motor combustion chamber will be significantly higher when the propellant is fired at a high temperature, such as 165° F., for example, than when the propellant is fired at a low temperature such as, for example —65° F. This variation in chamber pressure naturally creates thrust characteristics that vary over a wide range. Additionally, due to the temperature sensitive phenomena, the burning duration of the propellant will also vary significantly, depending upon the temperature at which the propellant is fired. Through use of a variable throat area nozzle, it has been found possible to back pressure a rocket motor and combustion chamber, thus to regulate the pressure within the motor combustion chamber and thereby to control the burning duration and the thrust of such motor with extreme accuracy.

Several attempts have been made heretofore to regulate rocket motor combustion chamber pressure; however high temperatures and pressures, erosion conditions and like problems have been encountered. Prior devices have accordingly been either unsuccessful or included structural characteristics that were such as to make these devices impractical from design, weight, function and other standpoints.

It is, accordingly, one important object of this invention to provide a novel variable throat area nozzle.

It is another important object of the invention to provide a variable throat area nozzle for use with rocket motors or the like and wherein a throat area is established and variably maintained in response to changes in pressure in a rocket motor combustion chamber.

A further object of the invention is to provide a variable throat area nozzle for the purpose described and which is simple in construction, light in weight, efficient in operation and relatively inexpensive for manufacture.

A still further important object of the invention is to provide a variable throat area nozzle having a plurality of circumferentially spaced vanes in the nozzle throat, means being provided to position these vanes within the throat and restrict fluid flow therethrough in response to changes in pressure upstream from the throat.

Other and further important objects of the invention will become apparent from the disclosures in the following detailed specification, appended claims and accompanying drawing, wherein:

Figure 1 is a longitudinal view, partially in section, of the present variable area nozzle structure;

Fig. 2 is a transverse sectional view through the throat of the variable area nozzle as taken substantially as indicated by line 2—2, Fig. 1; and Fig. 3 is a fragmentary elevational view of one of the throat flow restricting vanes, as taken substantially as indicated by line 3—3, Fig. 1.

With reference to the drawing, the variable throat area nozzle of this invention is shown as indicated generally at 10 and mounted in association with a rocket motor 11 having a combustion chamber 12 in which a propellant 13 may be retained. It is the usual practice that an igniter 14 be positioned in association with the motor 11 whereby to provide means for igniting the propellant 13 when such is desired.

The nozzle 10 includes an elongated body 15 that has a conically converging induction portion 16 and a conically diverging discharge portion 17, the two portions 16 and 17 being joined by a reduced area throat section 18. The free end of the induction portion 16 is flanged and adapted for threadable engagement, as shown at 20, with a flanged portion 21 of the rocket motor 11, a suitable sealing ring 22 being positioned between the portion 16 and the rocket motor 11.

The throat 18 is specifically formed within an insert 23 that may be made from any suitable material such as carbon or the like and having an ability to withstand high temperatures. An outer peripheral surface 24 of the insert 23 is adapted for disposition in an axial bore 25 of the nozzle body 15 and for retention therein by means of a close fit between the surface 24 and the bore 25. The insert 23 is provided with a plurality of radially extending recesses 26 in which plugs or vanes 27 are disposed. The plugs or vanes 27 are shown as being airfoil shaped; however, it is to be understood that these units may be of any desired shape commensurate with the particular control characteristics desired from the mechanism. The vanes 27 may be made from any suitable material such as, for example, a high temperature steel alloy or like substances. Inner free ends 28 of the vanes 27 are contoured to be coextensive with the surface of the throat 18 when the vanes are in a fully retracted position.

Each of the vanes 27 has a rod 30 connected thereto as by suitable threads. The rods 30 extend radially outwardly through openings 31 in the nozzle body 15, the radial outer ends thereof each being fitted with a suitable piston 32. The pistons 32 are reciprocally disposed in cylinders 33 forming portions of actuators, indicated generally at 34. The actuators 34 are each attached to the outer surface of the body 15 and secured thereto as by welding 35, or the like. The actuators 34 further include suitable recesses surrounding the shafts 30 and adapted for reception of a packing material 36. Outer ends of the actuators 34 are threadably fitted with caps 37, each of which is provided with a bleed opening 38.

As shown, each of the pistons 32 divides the respective cylinder 33 into a pair of chambers 40 and 41 and forms a movable wall therebetween. Compression springs 42 are disposed in the chambers 41 between one side of each of the pistons 32 and the inner surfaces of the caps 37, whereby normally to urge the pistons in a radially inward direction and the vanes 27 in a similar direction. The chambers 41 are vented to atmosphere by means of the bleed openings 38. The chambers 40 each communicate with the combustion chamber 12 of the rocket motor 11 by way of ports 43, conduits 44 and passageways 45. Passageways 45 are formed through the flanged end of the induction portion 16 of the nozzle, with the conduits 44 being secured at each end, respectively to the portion 16 and the actuators 43 by means of welding 46 or the like. Thus, each of the actuators 43 acts to position a single vane 27; however, all actuators sense the same chamber pressure whereby to induce positioning of all of the vanes in a simultaneous manner.

In operation, pressure within the combustion chamber 12 and upstream from the throat 18 of the nozzle is delivered to each of the chambers 40 and when this pressure exceeds the equal forces of the matched compression springs 42, the vanes 27 will be moved radially outwardly, thus to reduce their restriction of fluid flow through the throat 18 of the nozzle. As the pressure changes within the combustion chamber 12, this same pressure will be manifested in the chambers 40, thus to reposition the vanes 27 in accordance with such combustion chamber pressure changes.

Continued smooth reliable flow characteristics are maintained through the nozzle throat 18 by means of the particular shape characteristics of the vanes 27. In this connection it is to be understood that the specific number of vanes and actuators is a matter of choice, depending upon the particular control characteristics desired in specific instances. Thus propellant burning duration and thrust produced thereby may be maintained at a constant level regardless of conditions which would otherwise act to vary these factors. Maximum flow restriction through the nozzle by means of the vanes is normally determined by the range of possible pressures in the motor combustion chamber.

Having thus described the invention and the present embodiment thereof, it is desired to emphasize the fact that many modifications may be resorted to in a manner limited only by a just interpretation of the following claims.

We claim:

1. A variable area fluid nozzle for use with a vehicle propellant comprising, in combination: an elongated structure having a passage therethrough; a heat resistant insert positioned in said structure, a reduced cross-sectional area throat being formed in said insert; means for securing said structure to a discharge end of a propellant container; a plurality of radially disposed inwardly directed recesses in said insert; vanes slidably positioned in each of said recesses and projectable into said throat, said vanes being elongated in a direction parallel to a central axis of said passage structure and airfoil shaped with rounded leading edges and sharp trailing edges, said trailing edges being disposed normal to said axis of said passage structure; a plurality of housings carried by said structure, each of said housings having a piston slidably disposed therein; piston rods interconnecting said pistons and said vanes; compression springs disposed in said housings on one side of said pistons to bias said pistons in a direction to urge said vanes radially inwardly; and conduit means for conducting fluid under pressure from said container to another side of said pistons whereby to oppose compressive force of said springs and move said vanes radially outwardly thereby to control fluid flow through said throat in response to changes in fluid pressure in said container.

2. A variable area fluid nozzle for use with a vehicle propellant comprising, in combination: an elongated structure having a passage therethrough; a heat resistant insert positioned in said structure, a reduced cross-sectional area throat being formed in said insert; means for securing said structure to a discharge end of a propellant container; a plurality of radially disposed inwardly directed recesses in said insert; vanes slidably positioned in each of said recesses and projectable into said throat, said vanes being elongated in a direction parallel to a central axis of said passage structure and airfoil shaped with rounded leading edges and sharp trailing edges, said trailing edges being disposed normal to said axis of said passage structure; a plurality of housings carried by said structure, each of said housings having a piston slidably disposed therein; piston rods interconnecting said pistons and said vanes; seal means in said structure surrounding said piston rods; compression springs disposed in said housings on one side of said pistons to bias said pistons in a direction to urge said vanes radially inwardly; vent means in said housing for said one side of said piston; and conduit means for conducting fluid under pressure from said container to another side of said pistons whereby to oppose compressive force of said springs and move said vanes radially outwardly thereby to control fluid flow through said throat in response to changes in fluid pressure in said container.

References Cited in the file of this patent

UNITED STATES PATENTS

| | | |
|---|---|---|
| 2,552,497 | Roach et al. | May 8, 1951 |
| 2,570,847 | Ovens | Oct. 9, 1951 |
| 2,583,570 | Hickman | Jan. 29, 1952 |
| 2,612,747 | Skinner | Oct. 7, 1952 |
| 2,625,008 | Crook | Jan. 13, 1953 |
| 2,669,834 | Helms | Feb. 23, 1954 |
| 2,694,898 | Stauff | Nov. 23, 1954 |
| 2,715,311 | Coar | Aug. 16, 1955 |
| 2,737,019 | Billman | Mar. 6, 1956 |
| 2,755,620 | Gillot | July 24, 1956 |
| 2,763,426 | Erwin | Sept. 18, 1956 |

FOREIGN PATENTS

| | | |
|---|---|---|
| 1,036,540 | France | Sept. 8, 1953 |
| 1,110,011 | France | Oct. 5, 1955 |
| 700,754 | Great Britain | Dec. 9, 1953 |